(12) United States Patent
Kitamura

(10) Patent No.: US 6,646,399 B2
(45) Date of Patent: Nov. 11, 2003

(54) CONTROLLER FOR SHUTTING APPARATUS

(75) Inventor: Tetsuo Kitamura, Aichi-ken (JP)

(73) Assignee: Harmony Co., Ltd. (JP)

(*) Notice: Subject to any disclaimer, the term of this patent is extended or adjusted under 35 U.S.C. 154(b) by 0 days.

(21) Appl. No.: 09/727,319

(22) Filed: Nov. 30, 2000

(65) Prior Publication Data

US 2001/0000294 A1 Apr. 19, 2001

(51) Int. Cl.[7] .............................. H02P 1/00; H02P 3/00; H02P 7/00
(52) U.S. Cl. ........................ 318/445; 318/256; 318/257; 318/265; 318/266; 318/280; 318/432; 318/466; 318/468
(58) Field of Search ................................ 318/256, 257, 318/264, 265, 266, 280, 432, 445, 452, 468, 254, 466

(56) References Cited

U.S. PATENT DOCUMENTS

| 4,999,551 | A | * | 3/1991 | Yoshida et al. | 318/286 |
|---|---|---|---|---|---|
| 5,530,329 | A | * | 6/1996 | Shigematsu et al. | 318/469 |
| 5,689,160 | A | * | 11/1997 | Shigematsu et al. | 318/281 |
| 5,764,008 | A | * | 6/1998 | Hahn et al. | 318/256 |
| 5,955,854 | A | * | 9/1999 | Zhang et al. | 318/480 |
| 5,982,124 | A | * | 11/1999 | Wang | 318/466 |
| 5,983,567 | A | * | 11/1999 | Mitsuda | 49/26 |
| 5,994,858 | A | * | 11/1999 | Miura | 318/283 |
| 6,043,620 | A | * | 3/2000 | Koestler | 318/282 |
| 6,107,765 | A | * | 8/2000 | Fitzgibbon et al. | 318/266 |
| 6,111,374 | A | * | 8/2000 | Fitzgibbon et al. | 318/282 |
| 6,339,305 | B1 | * | 1/2002 | Ishihara et al. | 318/445 |
| 6,359,402 | B1 | * | 3/2002 | Tyckowski | 318/286 |
| 6,426,604 | B1 | * | 7/2002 | Ito et al. | 318/466 |
| 6,452,353 | B1 | * | 9/2002 | Calamatas | 318/466 |
| 6,456,027 | B1 | * | 9/2002 | Pruessel | 318/445 |

FOREIGN PATENT DOCUMENTS

| JP | 7-51878 | | 6/1995 | ............ E06B/9/80 |
|---|---|---|---|---|
| JP | 09-217549 | * | 8/1997 | ............ E05F/15/10 |
| JP | 2000-314285 | * | 11/2000 | ............ E05B/9/204 |

* cited by examiner

Primary Examiner—Robert E. Nappi
Assistant Examiner—Tyrone Smith
(74) Attorney, Agent, or Firm—Synnestvedt & Lechner LLP

(57) ABSTRACT

A controller for a shutter moved between an opened position and a closed position. A plurality of location ranges is defined between the opened position and the closed position. The controller detects the current moving speed of the shutter in each range, compares the moving speed with a predetermined reference speed, and generates a stop signal based on the comparison result to stop the movement of the drive mechanism.

6 Claims, 2 Drawing Sheets

CONTROLLER FOR SHUTTING APPARATUS

BACKGROUND OF THE INVENTION

The present invention relates to a shutting apparatus, and more particularly, to a controller for stopping a motor that drives a shutting apparatus when an obstacle causes an overload to be applied to a shutting apparatus.

A shutter driven by an electric motor typically includes a slat curtain and a spool about which the slat curtain is wound. The motor rotates the spool to wind the slat curtain and raise the shutter or to unwind the slat curtain from the spool and lower the shutter. The rotating speed of the drive motor (current speed) is compared with a predetermined rotating speed (reference speed). If the difference in rotating speed is not within a predetermined range, the motor is stopped.

However, the weight of the unwound portion of the slat curtain changes as it moves. Further, the speed of the slat curtain movement gradually varies as time passes by. Therefore, the load applied to the motor differs as the slat curtain is unwound from the spool. To balance the weight of the slat curtain so that the load applied to the motor is uniform, the spool may be provided with a balance spring. However, it is difficult to maintain the same load throughout the entire moving range of the slat curtain with the balance spring. Furthermore, the load applied to the motor may differ greatly over time for any given position of the slat curtain. Thus, the motor may not be controlled in the desired manner if the same conditions are used to stop the motor. For example, operation of the shutter may be interrupted by a slight load. On the other hand, the shutter may keep operating even when an obstacle causes an overload to be applied the motor.

SUMMARY OF THE INVENTION

It is an object of the present invention to provide a controller for a shutting apparatus that smoothly stops a motor that drives a shutting member.

To achieve the above object, the present invention provides a shutting apparatus. The shutting apparatus includes a shutting member that is opened and closed in predetermined directions and a drive mechanism for moving the shutting member in an opening direction and a closing direction between an opened position and a closed position. A plurality of location ranges is defined between the opened position and the closed position. A controller detects the current speed of the drive mechanism in each range, compares a predetermined reference speed and the current speed, and generates a stop signal based on the comparison result to stop the operation of the drive mechanism.

A further aspect of the present invention provides a shutting apparatus. The shutting apparatus includes a shutting member that is opened and closed in predetermined directions, a drive mechanism for moving the shutting member in an opening direction and a closing direction between an opened position and a closed position, and a transmission train arranged between the drive mechanism and the shutting member. The transmission train includes a first output unit. A position detector is located in the transmission train to detect the position of the shutting member and to generate a position detection signal. A second output unit is connected to the drive mechanism. A speed detector is included in the second output unit to detect the speed of the second output unit and to generate a speed signal. A location range memory stores positions of the shutting member in association with a plurality of location ranges defined between the opened position and the closed position in accordance with the position detection signal from the position detector. An output computation device computes the speed of the second output unit from the speed signal of the speed detector. An output memory stores a reference speed of the second output unit for each location range. A processor compares the reference speed with the computed speed of the second output unit for each location range and generates a stop signal based on the comparison result to stop operation of the drive mechanism.

Another aspect of the present invention provides a method for controlling a shutting apparatus. The shutting apparatus includes a shutting member that is opened and closed in predetermined directions and a drive mechanism for moving the shutting member in an opening direction and a closing direction between an opened position and a closed position. The method includes defining a plurality of location ranges between the opened position and the closed position, detecting the speed of the drive mechanism in each location range, comparing a predetermined reference speed and the detected speed for each location range, and generating a stop signal based on the comparison result to stop the operation of the drive mechanism.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
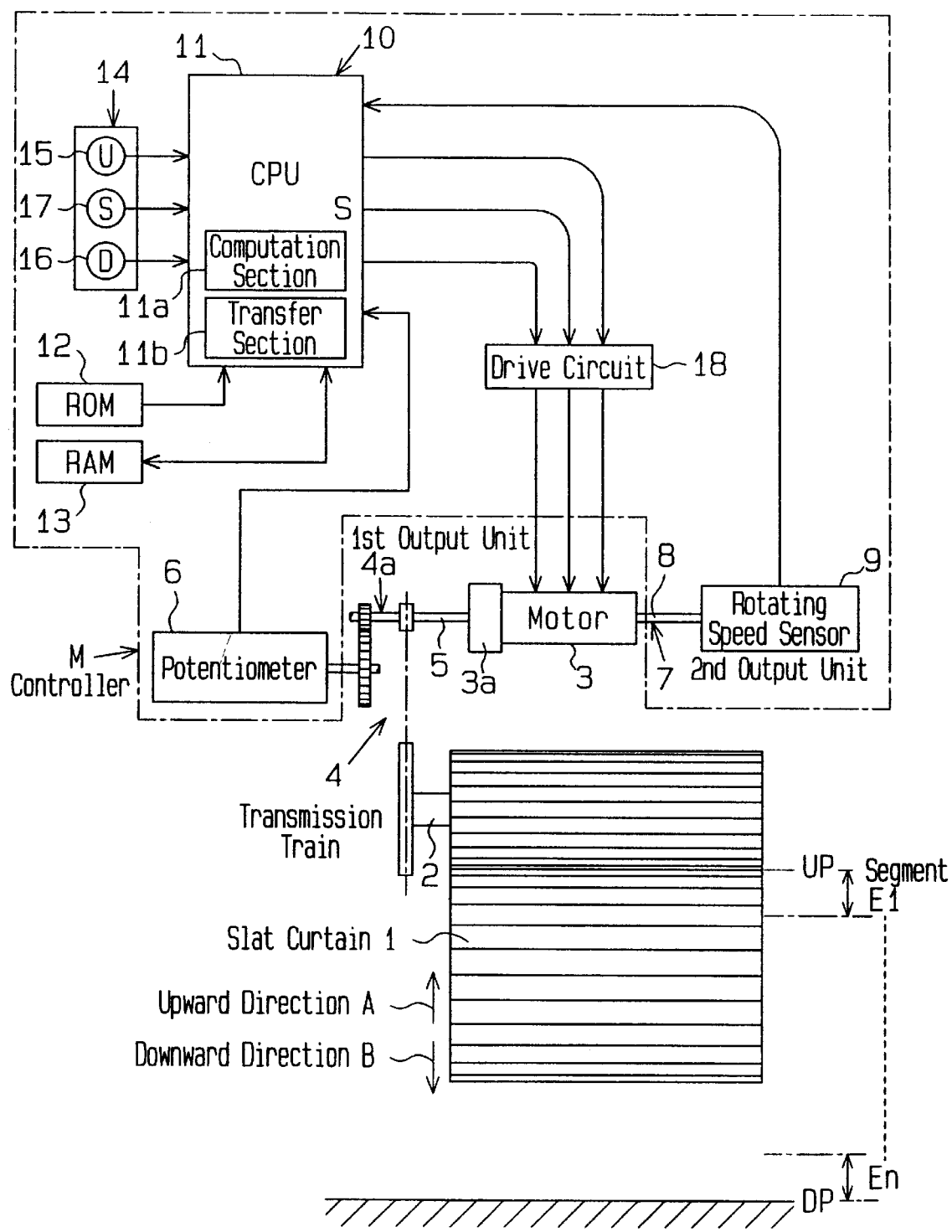
FIG. 1 is a schematic block diagram of a shutting apparatus according to the present invention.

In the drawings, like numerals are used for like elements throughout.

FIG. 1 is a schematic block diagram showing a shutting apparatus according to the present invention. In this embodiment, a motor-driven garage door shutter is employed as the shutting apparatus.

Mechanical Structure of the Shutter

The shutter has a slat curtain 1, which is wound about a spool 2. The curtain 1 is supported by a guide (not shown) so that it is raised in an upward direction A (opening direction) when wound about the spool 2 and lowered in a downward direction B (closing direction) when unwound from the spool 2. A balancing spring (not shown) is arranged between the spool 2 and a fixed shaft (not shown) that supports the spool 2. The balance spring balances the weight of the slat curtain 1.

A motor 3 having a deceleration mechanism 3a is connected to the slat curtain 1 through a transmission train 4. The transmission train 4 includes a first output unit 4a connected to the deceleration mechanism 3a. The first output unit 4a connects a first output shaft 5 of the motor 3 to a potentiometer 6. The rotation of the first output shaft 5 is transmitted to the potentiometer 6 and to the spool 2. A second output unit 7 connects a second output shaft 8 of the motor 3 to a rotating speed sensor 9, which detects the rotating speed of the second output shaft 8.

Electrical Structure of the Shutter

The shutting apparatus is provided with a microcomputer 10. The microcomputer 10 includes a CPU 11, a ROM 12, which stores a computer operation program and various fixed data, and a RAM 13 (computation memory), which stores input data and data during and after computation. The CPU 11 includes a register (not shown), which stores data, a computation section 11a, which computes data, and a transfer section 11b, which controls data transfer between the CPU 11 and other sections.

An operation panel 14 includes a raising switch 15, a lowering switch 16, and a stopping switch 17. The switches 15, 16, 17 respectively provide raising, lowering, and stopping operation signals to the CPU 11 via an I/O interface (not shown). In accordance with the received operation signal, the CPU 11 enters a raising mode, a lowering mode, or a stopping mode. Further, the CPU 11 provides a raising control signal, a lowering control signal, and a stopping control signal to a drive circuit 18 via the I/O interface in accordance with the operation signal. In accordance with the control signal, the drive circuit 18 controls the motor 3. That is, the slat curtain 1 is moved in the upward direction A in accordance with the raising control signal, is moved in the downward direction B in accordance with the lower control signal, and is stopped in accordance with the stopping control signal.

A controller M is formed by the CPU 11, the ROM 12, the RAM 13, the raising, lowering, and stopping switches 15, 16, 17 of the operation panel 14, the drive circuit 18, the potentiometer 6, and the rotating speed sensor 9. The controller M performs the processing described below whenever the raising mode or the lowering mode is entered.

Operation of Controller M

The potentiometer 6 generates a position detection signal, which has a predetermined voltage in accordance with the rotational position of the first output unit 4a, and sends the position detection signal to the CPU 11. The position detection signal indicates the actual position of the lower end of the slat curtain 1.

The rotating speed sensor 9 detects the rotating speed (current speed) of the second output unit 7 and provides a rotating speed detection signal (current speed signal) to the CPU 11 via the I/O interface.

In the ROM 12, the positions of the lower end of the slat curtain 1, are stored in correspondence with a plurality of location ranges E1–En. As shown in FIG. 1, the plurality (the number of which is n, e.g., 128) of location ranges E1–En are defined between an uppermost position (open position) UP and a lowermost position (close position) DP of the lower end of the slat curtain 1.

For each of the ranges E1–En, the RAM 13 stores the rotating speed of the second output unit 7 obtained during the previous operation as a reference speed signal. Accordingly, the rotating speeds, or the reference speed signals, are updated whenever the slat curtain 1 is raised or lowered. Initial values of the reference speed signals are stored in the ROM 12 and are transferred from the ROM 12 to the RAM 13 when the controller is activated.

The computation section 11a computes the rotating speed of the second output unit 7 based on the current rotating speed detection signal of the rotating speed sensor 9 and produces a current speed signal.

The transfer section 11b recognizes the range in which the lower end of the slat curtain 1 is currently located by referring to the relationship between the lower end of the slat curtain 1 and the ranges E1–En stored in the ROM 12. Then, the transfer section 11b reads the reference speed signal corresponding to the current range from the RAM 13 and compares the reference speed with the current speed computed by the computation section 11a. This comparison is performed for each range E1–En. When the difference between the current speed and the reference speed is not within a predetermined range, the transfer section 11b sends a stop signal S to the motor 3. Each of the ranges E1–En has a predetermined tolerance range, which indicates the tolerance range of the speed difference (the difference between the current speed and the reference speed). Each predetermined range is stored in the ROM 12.

If it is determined by this process that the difference between the current speed and the reference speed in any one of the ranges E1–En is not within the predetermined range, the motor 3 receives the stop signal S and stops operation.

Figure 2:
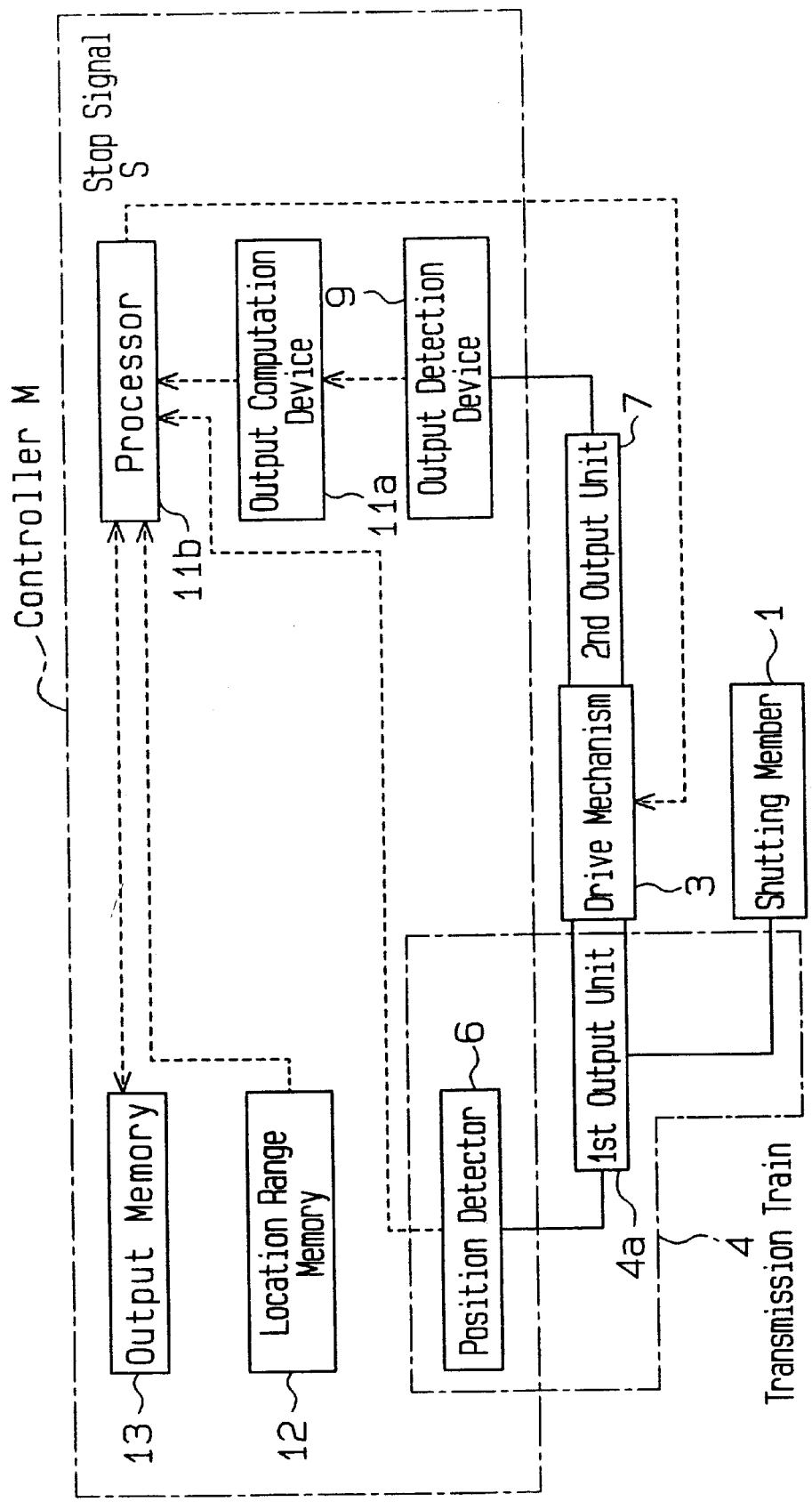
FIG. 2 is a further block diagram illustrating the present invention.

FIG. 2 is a block diagram illustrating the present invention. The structure of the present invention shown in FIG. 2 and the illustrated embodiment correspond as described below.

The slat curtain 1 corresponds to the shutting member, the motor 3 corresponds to the drive mechanism, and the potentiometer 6 corresponds to the position detector. The ROM 12 corresponds to the location range memory and the RAM 13 corresponds to the output memory. The rotating speed sensor 9 corresponds to the output detection device, the computation section 11a corresponds to the output computation device, and the transfer section 11b corresponds to the processor.

The controller according to the preferred and illustrated embodiment has the advantages described below.

A plurality of location ranges E1–En is defined between the uppermost position UP and the lowermost position DP of the slat curtain 1. The load applied to the motor 3 is monitored in each of the ranges E1–En. If the load is abnormal, the CPU 11 provides the motor 3 with the stop signal S. The conditions for generating the stop signal S may be the same or different in each of the ranges E1–En. However, it is preferred that the most appropriate condition be selected for each of the ranges E1–En.

Accordingly, even if the load applied to the motor 3 changes between different ranges E1–En, the motor 3 is controlled in an optimal manner. Thus, the motor 3 is controlled in a desirable manner regardless of the lower end position of the slat curtain 1.

It should be apparent to those skilled in the art that the present invention may be embodied in many other specific forms without departing from the spirit or scope of the invention. Particularly, it should be understood that the present invention may be embodied in the following forms.

For each of the ranges E1–En, the reference speed of the second output unit 7 may be prestored in the ROM 12 as a fixed value. The reference speed may be the same or different from one of the ranges E1–En to another. In this embodiment, the transfer section 11b compares the reference speed signal from the ROM 12 and the current speed signal from the computation section 11a for each of the ranges E1–En. When the difference between the current speed and the reference speed is not within a predetermined range, the transfer section 11b sends the stop signal S to the motor 3 via the I/O interface and the drive circuit 18.

The rotating speed sensor 9 may be provided in the transmission train 4, for example, at the first output shaft 5 of the first output unit 4a, or the spool 2.

A sensor other than the rotating speed sensor 9 may be used as the output detection device. In this case, the type of current speed signal and the reference speed signal differ in accordance with the type of sensor used. For example, if an encoder is used as the output detection device, the current speed signal and the reference speed signal are pulse signals. If a torquemeter is used as the output detection device, the current speed signal and the reference speed signal are torque values.

Instead of using a predetermined tolerance range, the reference speed signal of the second output unit 7 may be compared with the current speed signal in each range E1–En to determine whether there is an overload.

A position detection sensor other than the potentiometer 6 may be used as the position detector.

The processing for determining whether to stop the motor 3 may be performed in only one of the raise operation and lower operation.

The present invention may be applied to a shutter that is moved in a horizontal direction or to a blind.

The present examples and embodiments are to be considered as illustrative and not restrictive, and the invention is not to be limited to the details given herein, but may be modified within the scope and equivalence of the appended claims.

What is claimed is:

1. A shutting apparatus, comprising:
    a shutting member that is opened and closed in predetermined directions;
    a drive mechanism for moving the shutting member in an opening direction and a closing direction between an opened position and a closed position;
    a transmission train arranged between the drive mechanism, and the shutting member;
    a position detector located in the transmission train to detect the position of the shutting member and to generate a position detection signal;
    an output detection device for detecting the speed of the drive mechanism and for generating a speed signal;
    a location range memory for storing positions of the shutting member in association with a plurality of location ranges defined between the opened position and the closed position;
    an output computation device for computing the speed of the drive mechanism from the speed signal of the output detection device;
    an output memory for storing a reference speed of the drive mechanism for each location range; and
    a processor for comparing the reference speed with the computed speed of the drive mechanism for each location range and for generating a stop signal to stop operation of the drive mechanism when the difference between the predetermined reference speed and the current speed is outside a predetermined tolerance range.

2. The shutting apparatus according to claim 1, wherein the output memory stores as the reference speeds the speed of the drive mechanism for each location range during the previous operation of the shutter apparatus.

3. A shutting apparatus, comprising:
    a shutting member that is opened and closed in predetermined directions;
    a drive mechanism for moving the shutting member in an opening direction and a closing direction between an opened position and a closed position;
    a transmission train arranged between the drive mechanism and the shutting member, wherein the transmission train includes a first output unit;
    a position detector located in the transmission train to detect the position of the shutting member and to generate a position detection signal;
    a second output unit connected to the drive mechanism;
    a speed detector included in the second output unit to detect the speed of the second output unit and to generate a speed signal;
    a location range memory for storing positions of the shutting member in association with a plurality of location ranges defined between the opened position and the closed position in accordance with the position detection signal from the position detector;
    an output computation device for computing the speed of the second output unit from the speed signal of the speed detector;
    an output memory for storing a reference speed of the second output unit for each location range; and
    a processor for comparing the reference speed with the computed speed of the second output unit for each location range and for generating a stop signal to stop operation of the drive mechanism when the difference between the predetermined reference speed and the current speed is outside a predetermined tolerance range.

4. The shutting apparatus according to claim 3, wherein the output memory stores as the reference speeds the speed of the second output unit for each location range during the previous operation of the shutter apparatus.

5. The shutting apparatus according to claim 3, wherein the first output unit includes a first output shaft, the second output unit includes a second output shaft, the position detector is arranged to cooperate with the first output shaft, and the speed detector is arranged to cooperate with the second output shaft.

6. The shutting apparatus according to claim 5, wherein the output memory stores as the reference speeds the speed of the second output unit for each location range during the previous operation of the shutter apparatus.

* * * * *